(12) United States Patent
Buckland

(10) Patent No.: US 8,763,269 B2
(45) Date of Patent: Jul. 1, 2014

(54) BICYCLE SEATING POSITION MEASURING APPARATUS AND METHOD

(76) Inventor: Charles E. Buckland, Albuquerque, NM (US)

(*) Notice: Subject to any disclaimer, the term of this patent is extended or adjusted under 35 U.S.C. 154(b) by 212 days.

(21) Appl. No.: 13/414,903

(22) Filed: Mar. 8, 2012

(65) Prior Publication Data
US 2012/0246958 A1 Oct. 4, 2012

Related U.S. Application Data

(60) Provisional application No. 61/471,320, filed on Apr. 4, 2011.

(51) Int. Cl.
*G01B 3/08* (2006.01)
*G01B 5/14* (2006.01)

(52) U.S. Cl.
USPC .................... 33/809; 33/812; 33/512; 33/613

(58) Field of Classification Search
USPC ........... 33/809, 783, 806, 810, 811, 812, 512, 33/613
See application file for complete search history.

(56) References Cited

U.S. PATENT DOCUMENTS

| | | | | |
|---|---|---|---|---|
| 2,232,824 A * | 2/1941 | Maher | | 33/809 |
| 4,196,521 A * | 4/1980 | Hutchinson et al. | | 33/512 |
| 5,038,493 A * | 8/1991 | Stabs | | 33/809 |
| 6,470,591 B2 * | 10/2002 | Rutkowski | | 33/832 |
| 6,839,976 B2 * | 1/2005 | Winkenbach et al. | | 33/549 |
| 6,874,246 B2 * | 4/2005 | Cookson | | 33/806 |
| 7,526,874 B2 * | 5/2009 | Okura et al. | | 33/613 |
| 7,571,548 B2 * | 8/2009 | Taylor et al. | | 33/512 |
| 7,752,767 B2 * | 7/2010 | Mandaric | | 33/512 |
| 7,874,080 B1 * | 1/2011 | Morales | | 33/600 |
| 8,201,342 B2 * | 6/2012 | Gerster | | 33/512 |
| 8,523,875 B2 * | 9/2013 | Brown et al. | | 606/102 |
| 2007/0079521 A1 * | 4/2007 | Hill | | 33/809 |

* cited by examiner

*Primary Examiner* — Christopher Fulton
(74) *Attorney, Agent, or Firm* — Kermit D. Lopez; Luis M. Ortiz; Ortiz & Lopez, PLLC

(57) ABSTRACT

An apparatus and method for measuring a bicycle seating position. A telescoping rod includes a pinch closure, with contact points to attach to a pedal, a saddle, and a handlebar/stem. The telescoping rod includes a larger diameter rod with a small diameter rod that can slide into the larger diameter rod, thereby allowing the inner rod to move freely up or down to account for differing distances being measured. The smaller diameter rod can include a measuring scale to allow a user to read a measurement from one point to another, allowing for the measurement to be repeated. With the pinch closure, a user could take a measurement on one bicycle, carry it over to another bicycle and set a position on the second bicycle identical to that of the first bicycle.

18 Claims, 11 Drawing Sheets

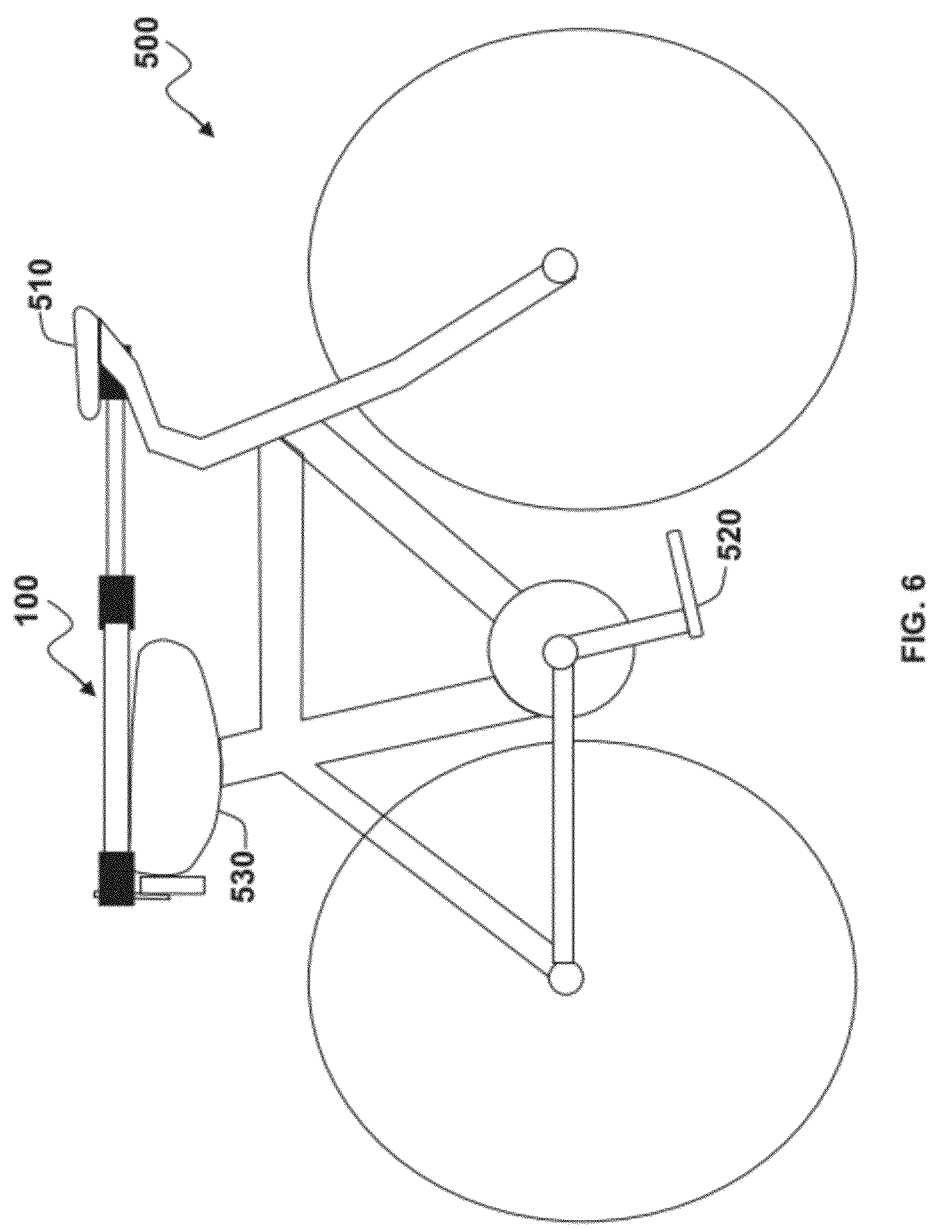

BICYCLE SEATING POSITION MEASURING APPARATUS AND METHOD

CROSS-REFERENCE TO PROVISIONAL PATENT APPLICATION

This patent application claims the benefit under 35 U.S.C. §119(e) of U.S. Provisional Application Ser. No. 61/471,320 entitled, "Bicycle Seating Positioning Measuring Apparatus and Method," which was filed on Apr. 4, 2011 and is incorporated herein by reference in its entirety.

TECHNICAL FIELD

Embodiments are generally related to devices for measuring a bicycle seating position. Embodiments also relate to devices for measuring distances from a bicycle pedal to a saddle and from saddle to handlebars of a bicycle. Embodiments also relate to an apparatus that allows the user to measure bicycle seating position in one bicycle and easily set those measurements in another bicycle.

BACKGROUND OF THE INVENTION

A bicycle seating position measuring device allows a user to take a measurement from one bicycle to another in order to obtain the same distances from pedal to saddle (bicycle seat) and from saddle to handlebars. As most enthusiastic cyclists know, the distance from the pedals to the saddle and the saddle to the handlebars affects the proper functioning and handling of the bicycle, the amount of power being distributed to the pedals, as well as allowing the cyclist more enjoyment and comfort from being properly seated on the bicycle.

When an individual purchases a bicycle, especially for participating in racing, long distance cycling events, or otherwise accustomed to ride a bicycle that is properly set up, the company from which the individual purchases the bicycle will likely take the time necessary to make sure the individual is properly set on the bicycle or properly fitted to the bicycle. The saddle height and the distance between the saddle and the handlebars are properly set according to the individual who rides the bicycle or bicycles.

Once the distance between the saddle and the other two points (pedal and handlebars) of contact has been established, any changes to any three of these contact areas may result in a change in the originally established seating position. An example of such changes may be the changing of the pedals (from thicker to thinner model, or vice versa or differently designed pedals), a change in the saddle (from larger to smaller, thicker to thinner, or vice versa), a change in the handlebar stem length (which increases or decreases the distance of the handlebars from the saddle) and a change in the crank arm length (which increases or decreases the distance of the pedals from the saddle).

In addition to the above changes, over the past several years the participation in national and international bicycling events has increased greatly, offering non-racing cyclists the opportunity to ride in areas of the world, or within their own country or state, where before only professionals would ride. Many companies offer group rides in far off locations. Some companies offer bicycles to be used by the participants and some cyclists break their own bicycle down for travel and reassemble them at their destination point. If a person uses a bicycle provided by a company, for example, the company may have someone to assist in fitting (e.g., setting saddle height as well as fore or aft positioning of the saddle) the participant to the bicycle. If not, then the cyclist is left to adjust the fit for him or herself. If someone breaks their bicycle down for travel, more than likely this requires the removal of their saddle, or adjusting its height for travel. Once the cyclist arrives at their destination, they must then readjust their saddle to its original height.

Whether a person uses a bicycle offered by the company or their own, the saddle needs to be readjusted. Many cyclists attempt to remember the saddle height by placing marks on the seat post, applying tape, taking a measurement and writing it down, or any number of means to place the saddle at the same height. However, these methods often do not work, or work sporadically as marking gets blurred or erased, the tape melts and slides or otherwise makes the seat post gummy.

In addition to travel considerations, avid cyclists are notorious for fiddling with their bicycles, making improvements and updating equipment. The cyclist may find a more comfortable or lighter saddle, a handlebar/stem combination that is better suited for their type of cycling, or new, lighter and better pedals. All the changes made may affect the position of the saddle in relation to the pedals and the handlebars. However, as a cyclist, none of these changes to the components of the bicycle should affect the actual riding position of the cyclist. These component changes are to make the cyclist perform at a higher degree of comfort, speed, and performance.

In addition to changes made to any specific bicycle as mentioned above, some avid cyclists have more than one bicycle. And once they have a position that feels comfortable and provides them with the degree of control, comfort and power, they wish to make sure their other bicycles have the same set up or configuration. This also makes it easy to switch between the different bicycles without having to worry about the set up of the riding position.

As a result of the issues described above, there exists a need for a bicycle seating position measuring apparatus that can assist the cyclist first in measuring the original position from pedals to saddle and from saddle to handlebar/stem on a properly adjusted bicycle and then allow for these measurements (distances) to be repeated on other bicycles or on the same bicycle after a change is made.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an apparatus for measuring bicycle seating position.

It is another aspect of the disclosed embodiments to provide an apparatus for measuring distances from pedal to saddle and from saddle to handlebars of a bicycle.

It is yet another aspect of the disclosed embodiments to provide for an apparatus that allows the user to measure bicycle seating position in one bicycle and easily set those measurements in another bicycle or on the same bicycle after a change is made.

The aforementioned aspects and other objectives and advantages can now be achieved as described herein. A bicycle seating position measuring apparatus generally includes a telescoping rod with a pinch closure system, and contact points at both ends of the apparatus to attach to a bicycle pedal, saddle, and/or handlebar/stem. The telescoping rod can include a larger diameter rod and a small diameter rod that slides into the larger diameter rod to allow the smaller diameter rod to move freely up or down and to account for variations in distances that are being measured. The smaller diameter rod can include a measuring scale (e.g., millimeters) to allow a user to read the measurement from one point to another, thus allowing for the measurement to be repeated. Additionally, by including a pinch closure or pinch closure system and/or one or more pinch closure components, a user can take a measurement on one bicycle, carry it over to another bicycle and set the position on the second bicycle identical to that of the first bicycle.

A number of embodiments, preferred and alternative, are disclosed herein. For example, in one embodiment, an apparatus for measuring a seating position of a bicycle can be implemented. Such an apparatus may include, for example, a telescoping rod comprising a larger diameter rod and a smaller diameter rod, wherein the smaller diameter rod slides into the larger diameter rod to permit an up and down movement of the smaller diameter rod; a pinch closure mechanism for locking a movement of the smaller diameter rod after measuring the seating position of the bicycle; a swing arm attached to the smaller diameter rod; and a flat portion rotatably attached to the swing arm and a non-slip component attached to the larger diameter rod, wherein the telescoping rod together with the pinch closure mechanism, the swing arm, the flat portion and the non-slip component assist in measuring the seating position of the bicycle.

In another embodiment, at least one fastening mechanism can be attached to the non-slip component. In yet another embodiment, the measuring distance between a saddle and a pedal of the bicycle can be determined by fastening the at least one fastening mechanism to the pedal and by resting the flat portion on the saddle. In still another embodiment, the measuring distance between the saddle and a handlebar of the bicycle can be determined by fastening the at least one fastening mechanism to the handlebar and by resting the flat portion behind the saddle. In another embodiment, the seating position of the bicycle can be utilized to set a seating position of another bicycle after measuring the seating position of the bicycle.

In other embodiments, the at least seating position measurement of the bicycle can be utilized to set the seating position of the bicycle when changes are made. In still other embodiments, the at least one fastening mechanism can include, for example, a pair of elastic straps. In other embodiments, the at least one fastening mechanism can include a combination of, for example, hook and loop straps. In still other embodiments, the at least one fastening mechanism can comprise a spring clasp.

In still another embodiment, an apparatus for measuring a seating position of a bicycle, can be implemented, which includes, for example, a telescoping rod comprising a larger diameter rod and a smaller diameter rod, wherein the smaller diameter rod slides into and is received by the larger diameter rod to permit an up and down movement of the smaller diameter rod with the larger diameter rod. Such an embodiment may also include, for example, a pinch closure mechanism for locking a movement of the smaller diameter rod after measuring the seating position of the bicycle; a swing arm attached to the smaller diameter rod; a flat portion rotatably attached to the swing arm; and a non-slip component attached to the larger diameter rod and at least one fastening mechanism, wherein the telescoping rod together with the pinch closure mechanism, the swing arm, the flat portion and the non-slip component assist in measuring the seating position of the bicycle.

In another embodiment, a method for measuring a seating position of a bicycle, can be implemented. Such a method can include, for example, configuring a telescoping rod to include a larger diameter rod and a smaller diameter rod, wherein the smaller diameter rod slides into the larger diameter rod to permit an up and down movement of the smaller diameter rod; providing a pinch closure mechanism for locking a movement of the smaller diameter rod after measuring the seating position of the bicycle; attaching a swing arm to the smaller diameter rod; rotatably attaching a flat portion to the swing arm; and connecting a non-slip component to the larger diameter rod, wherein the telescoping rod together with the pinch closure mechanism, the swing arm, the flat portion and the non-slip component assist in measuring the seating position of the bicycle.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

FIG. 6 illustrates a perspective view of a bicycle with the bicycle seating position measuring apparatus of FIG. 1 utilized for measuring distance between handlebars and a saddle, in accordance with the disclosed embodiments;

DETAILED DESCRIPTION

The particular values and configurations discussed in these non-limiting examples can be varied and are cited merely to illustrate one or more embodiments and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly defined herein.

Figure 1A:
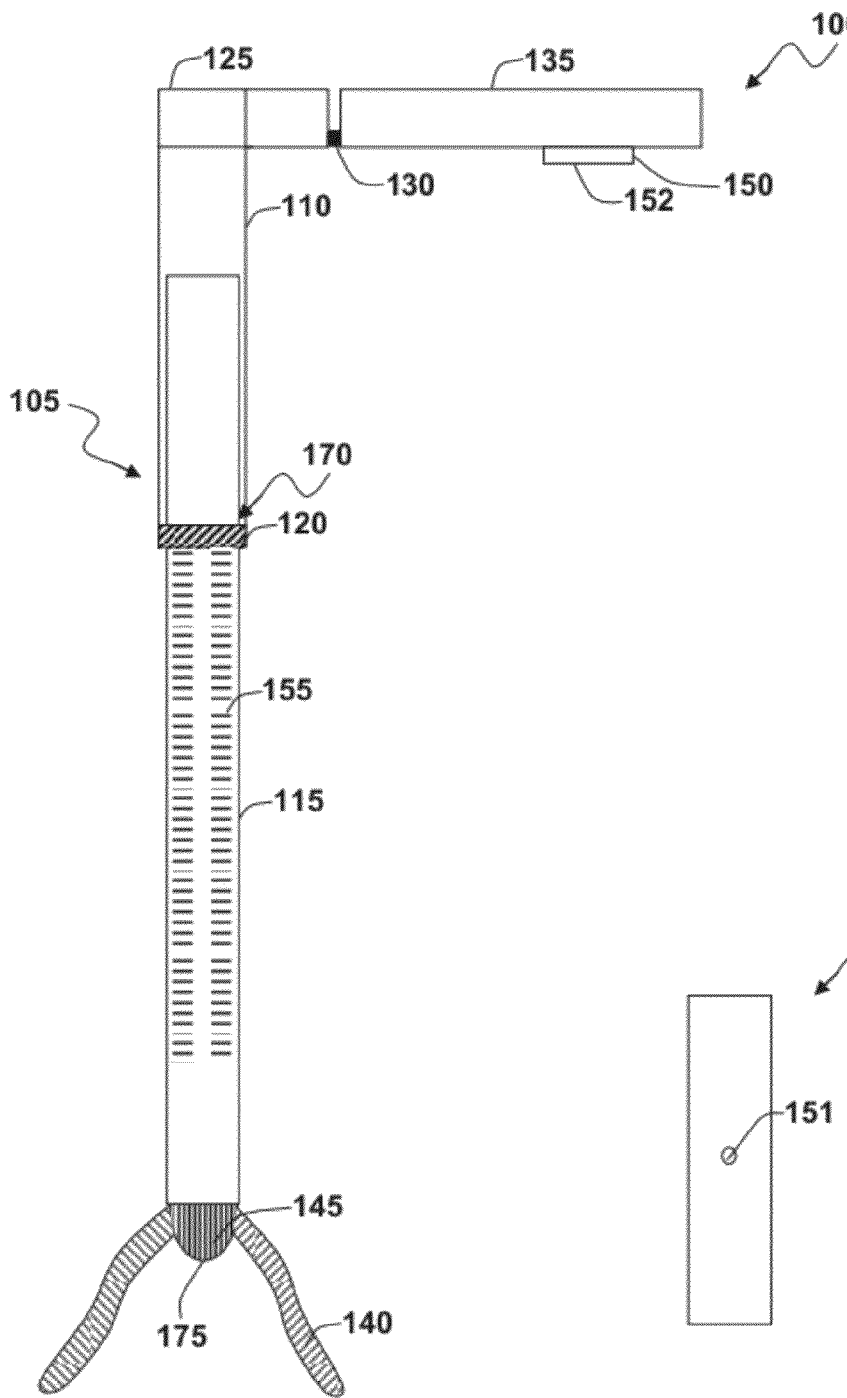
FIG. 1A illustrates a schematic diagram of a bicycle seating position measuring apparatus, in accordance with the disclosed embodiments.

FIG. 1A illustrates a schematic diagram of a bicycle seating position measuring apparatus 100, in accordance with the disclosed embodiments. The bicycle seating position measuring apparatus 100 consists of a telescoping rod 105 with a pinch closure system 170, with contact points 152 and 175 at both ends of the apparatus to attach to the pedal, saddle, and handlebar/stem of a bicycle. The telescoping rod 105 consists of one larger diameter rod 110 with a small diameter rod 115 that will slide into the larger diameter rod 110, thereby allowing the small diameter rod 115 to move freely up or down to account for differing distances that are being measured (similar to legs on a camera tripod). The smaller diameter rod 115 will have a measuring scale 155 (in millimeters) to allow a user to read the measurement from one point to another, thus allowing for the measurement to be repeated. A pinch closure system 170 can include an attaching component such as, for example, a pinch bolt 120 or another appropriate attachment component that allows a user to take measurement on one bicycle, carry it over to another bicycle and set the position on the second bicycle identical to the first bicycle.

The smaller diameter rod 115, at the contact point 175 has a rubber non-slip component 145 combined with elastic straps 140 that will enable the contact point 175 to sit on the top of the pedal or handlebar and be strapped to the pedal or handlebar to keep it from moving.

Figure 1B:
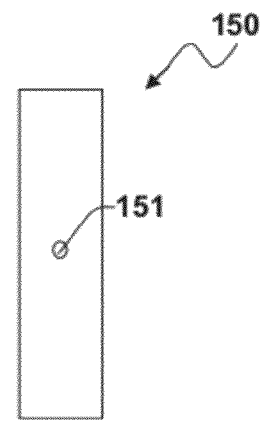
FIG. 1B illustrates a bottom view of the flat portion of the swing arm of FIG. 1A, in accordance with the disclosed embodiments.

The larger diameter rod 110 has a connecting point 125 at its end that will consist of a device similar to a height measuring scale wherein a swing arm 135 will extend from the body of the larger diameter rod 110 out and over or behind the saddle. The swing arm 135 is connected a flat portion 150 of solid material (such as plastic) that is approximately 8" long by 3" wide by, for example, a centered bolt 151 (or another appropriate attachment component) as shown in FIG. 1B that allows the flat portion 150 to rotate freely. A hinge 130 for upper contact point 152 is shown in FIG. 1A.

Figure 2A:
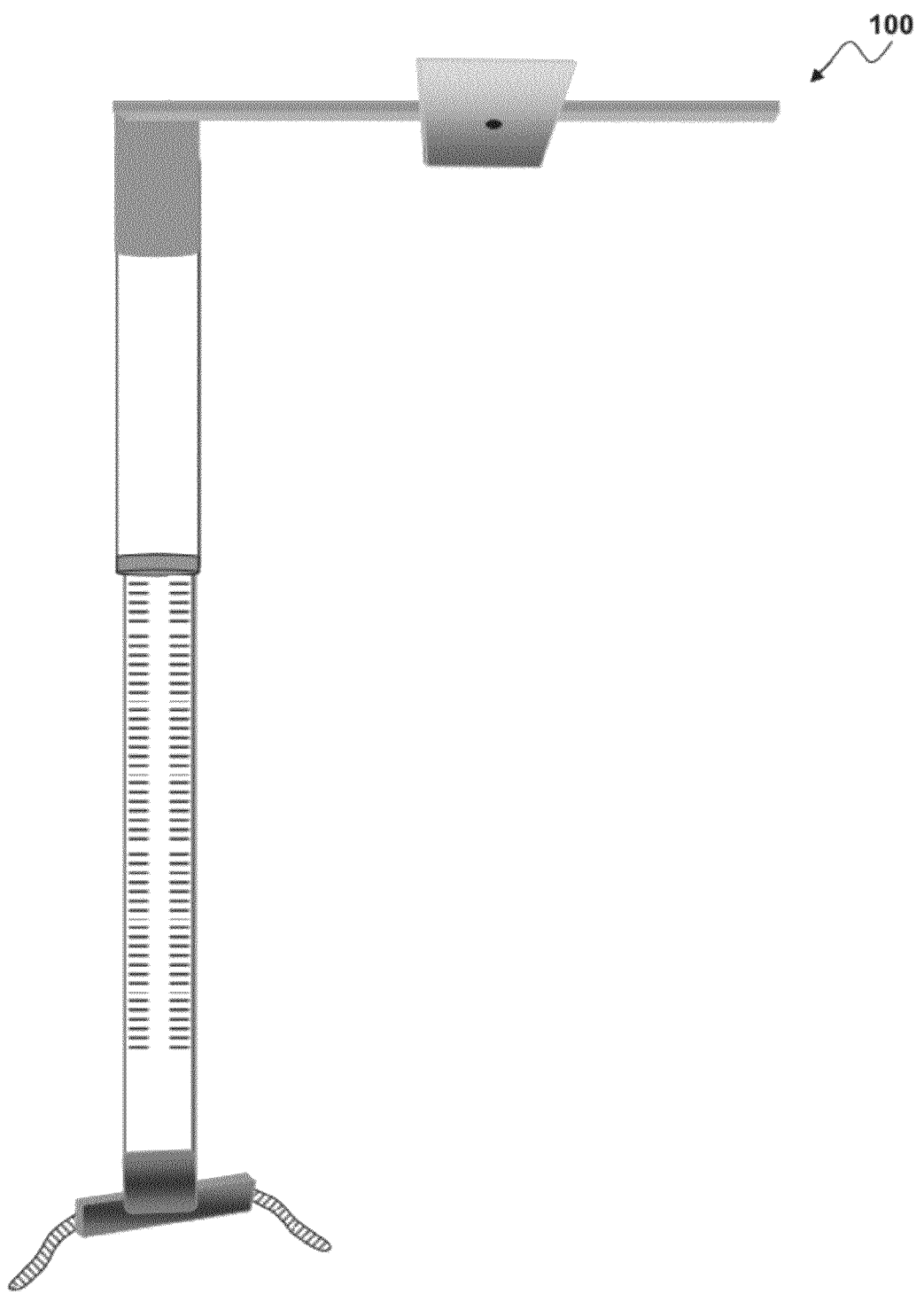
FIGS. 2A, 2B and 2C illustrate perspective views of the bicycle seating position measuring apparatus of FIG. 1, in accordance with the disclosed embodiments.
Figure 2B:
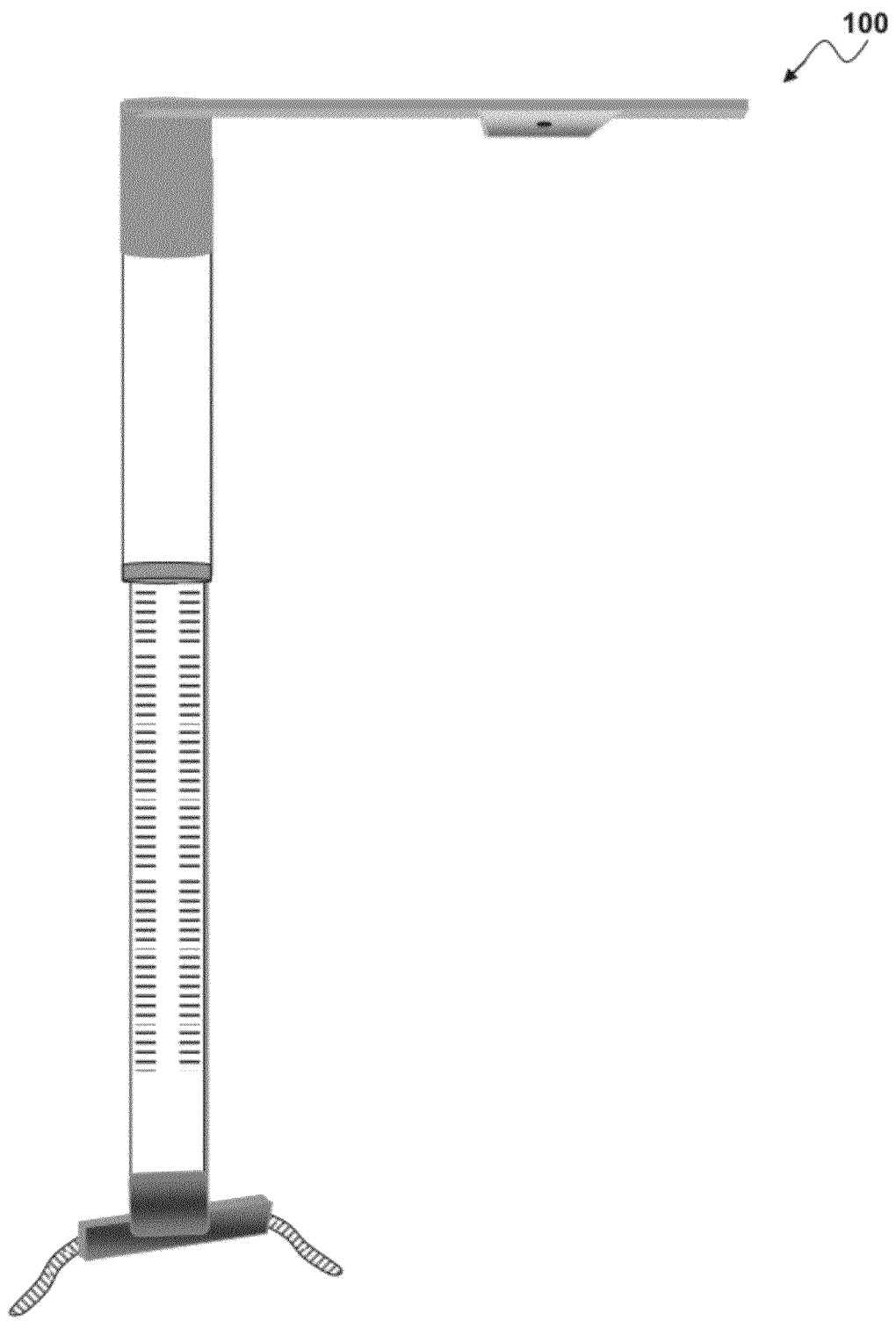
Figure 2C:
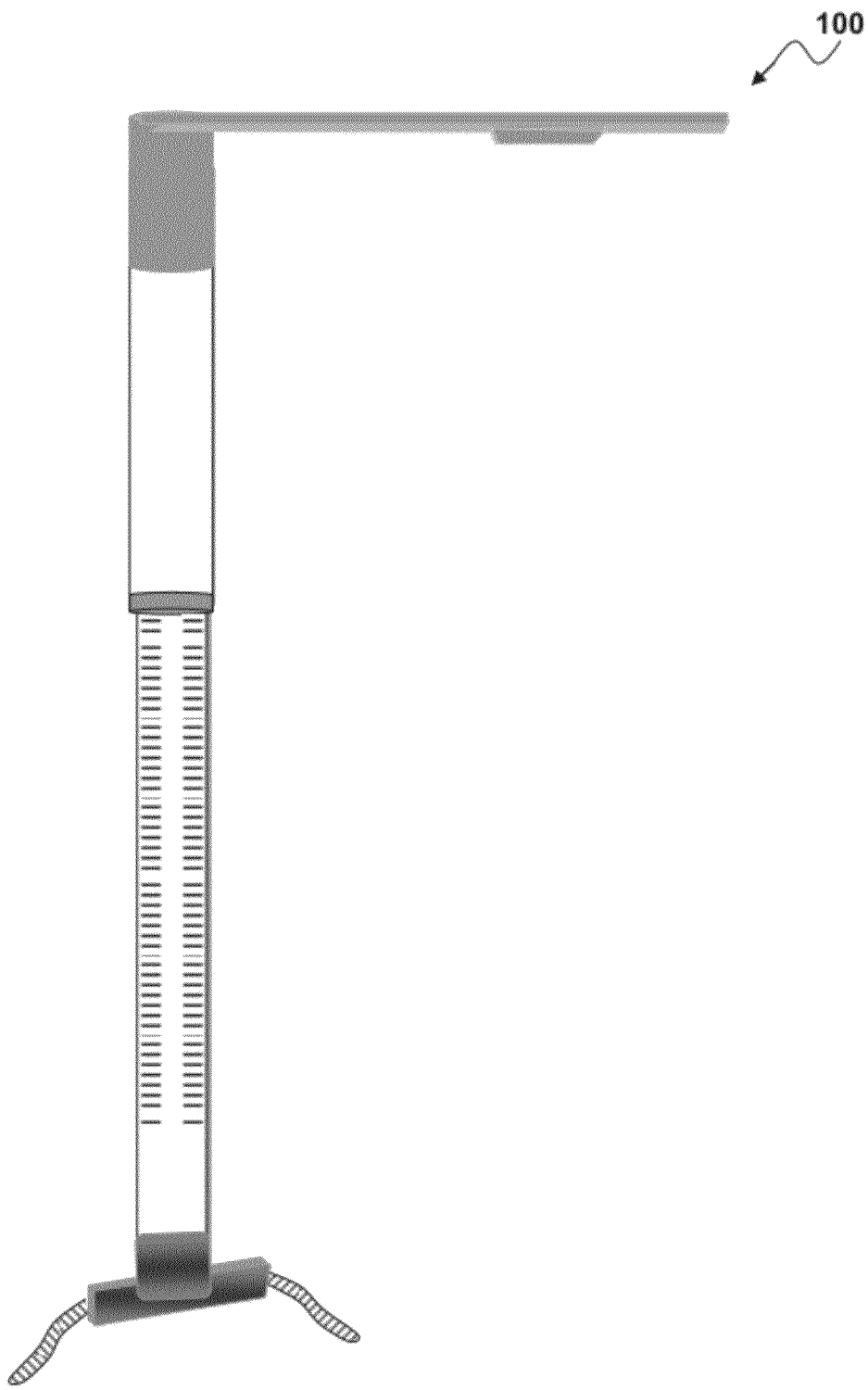

FIGS. 2A, 2B and 2C illustrate perspective views of the bicycle seating position measuring apparatus of FIG. 1, in accordance with the disclosed embodiments. FIG. 2A and FIG. 2B shows the centered bolt 151 of the flat portion 150. The rotation allows the apparatus 100 to be collapsed for easier travel and to ensure that the flat portion 150, when properly set on or behind the saddle, will produce a correct reading.

Figure 3:
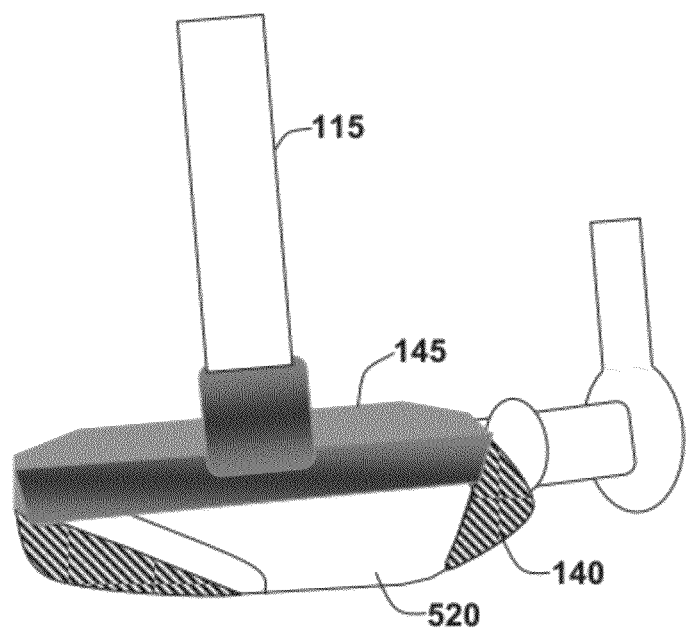
FIG. 3 illustrates a perspective view of the non-slip component of the bicycle seating position measuring apparatus of FIG. 1 connected to a pedal of a bicycle, in accordance with the disclosed embodiments.
Figure 4:
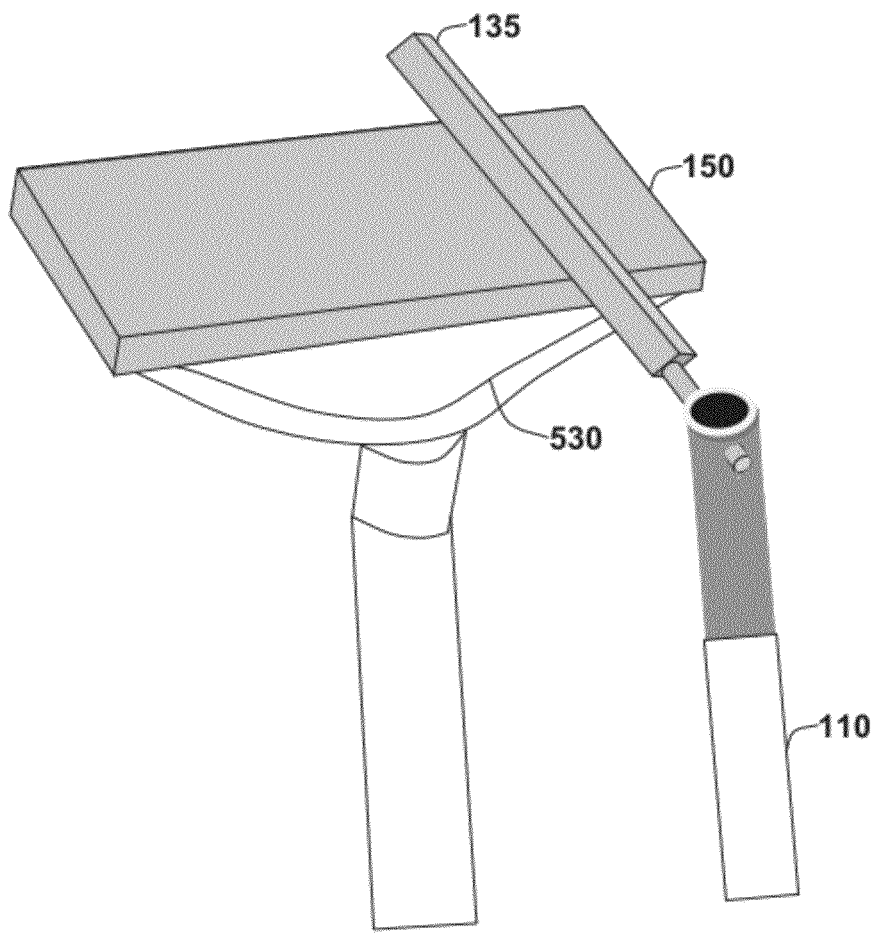
FIG. 4 illustrates a perspective view of the flat portion of the bicycle seating position measuring apparatus of FIG. 1 resting on the top of a saddle of a bicycle, in accordance with the disclosed embodiments.

FIG. 3 illustrates a perspective view of the non-slip component 145 of bicycle seating position measuring apparatus 100 of FIG. 1 connected to a pedal 520 of a bicycle, in accordance with the disclosed embodiments. FIG. 4 illustrates a perspective view of the flat portion of bicycle seating position measuring apparatus 100 of FIG. 1 resting on the top of the saddle 530 of a bicycle, in accordance with the disclosed embodiments. The flat portion 150, which is attached to the end of the swing arm 135, will rest on top of the saddle 530. This will allow for the measuring apparatus to account for the thickness of the saddle 530. Once the smaller diameter rod 115 is connected to the pedal 520 (in which the pedal is extended to its most further point from the saddle), the larger diameter rod 110, with the swing arm 135 attachment extended over the saddle 530, is then lowered to the saddle 530 so that the flat portion 150 just rests on the saddle 530. The pinch bolt 120 at the end of the larger diameter rod 110 as shown in FIG. 1A, can be then engaged and a measurement taken and noted. The apparatus 100 can then be removed from the bicycle.

Figure 5:
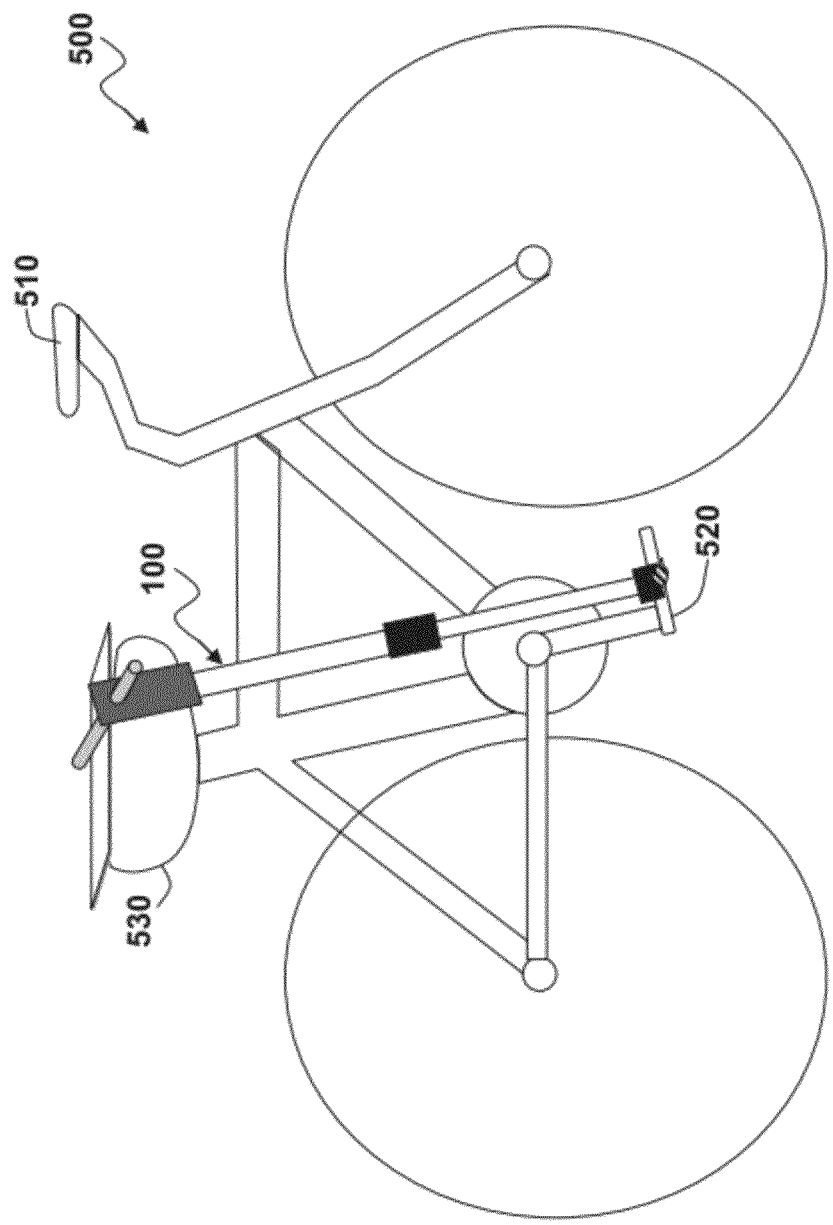
FIG. 5 illustrates a perspective view of a bicycle with the bicycle seating position measuring apparatus of FIG. 1 utilized for measuring distance between a pedal and a saddle, in accordance with the disclosed embodiments.

A user can complete this task whether the bicycle is in a bicycle stand or simply leaning against a wall. FIG. 5 illustrates a perspective view of a bicycle 500 with bicycle seating position measuring apparatus 100 of FIG. 1 utilized for measuring distance between the pedal 520 and the saddle 530, in accordance with the disclosed embodiments. When measuring from pedal 520 to saddle 530, the small diameter rod 115 can have at its end a contact point 175 containing a rubber non-slip component 145 combined with elastic straps or a spring clasp 175 that can enable the apparatus 100 to be connected to the pedal 520 to keep the apparatus 100 from moving.

The flat portion 150 attached to the end of the swing arm 135 rests on the top of the saddle 530 to measure the distance from the top of the saddle 530 to the pedal 520. Once the smaller diameter rod 115 is connected to the pedal 520, the larger diameter rod 110, with the swing arm 135 attachment extended over the saddle 530, is then adjusted to rest on the saddle 530. The pinch bolt 151 on the larger diameter rod 110 is then engaged and a measurement is made and noted. The apparatus 100 can then be removed from the bicycle 500. A user can complete this task whether the bicycle is supported by a bicycle stand or simply leans against a wall.

FIG. 6 illustrates a perspective view of a bicycle with the bicycle seating position measuring apparatus 100 of FIG. 1 utilized for measuring distance between handlebar/stem 510 and saddle 530, in accordance with the disclosed embodiments. When measuring the distance from handlebar/stem 510 to saddle 530, the small diameter rod 115 will have at its end a contact point 175 containing a rubber non-slip component 145 combined with elastic straps or a spring clasp 175 that will enable the apparatus 100 to be connected to the intersection of the handlebar/stem 510 to keep the apparatus 100 from moving.

The flat portion 150 attached to the end of the swing arm 135 generally rests behind the saddle 530 in order to measure the distance from the back of the saddle 530 to the connection to the handlebar/stem 510. Once the smaller diameter rod 115 is connected to the intersection of the handlebar/stem 510, the larger diameter rod 110, with the swing arm 135 attachment extended behind the saddle 530, can be then adjusted to rest against the back of the saddle 530. The larger diameter rod 110 simply rests on the top of the saddle 530 to assist in obtaining the correct distance. The pinch bolt 151 on the larger diameter rod 110 can be then engaged and a measurement made and noted. The apparatus 100 can then be removed from the bicycle 500.

Figure 7A:
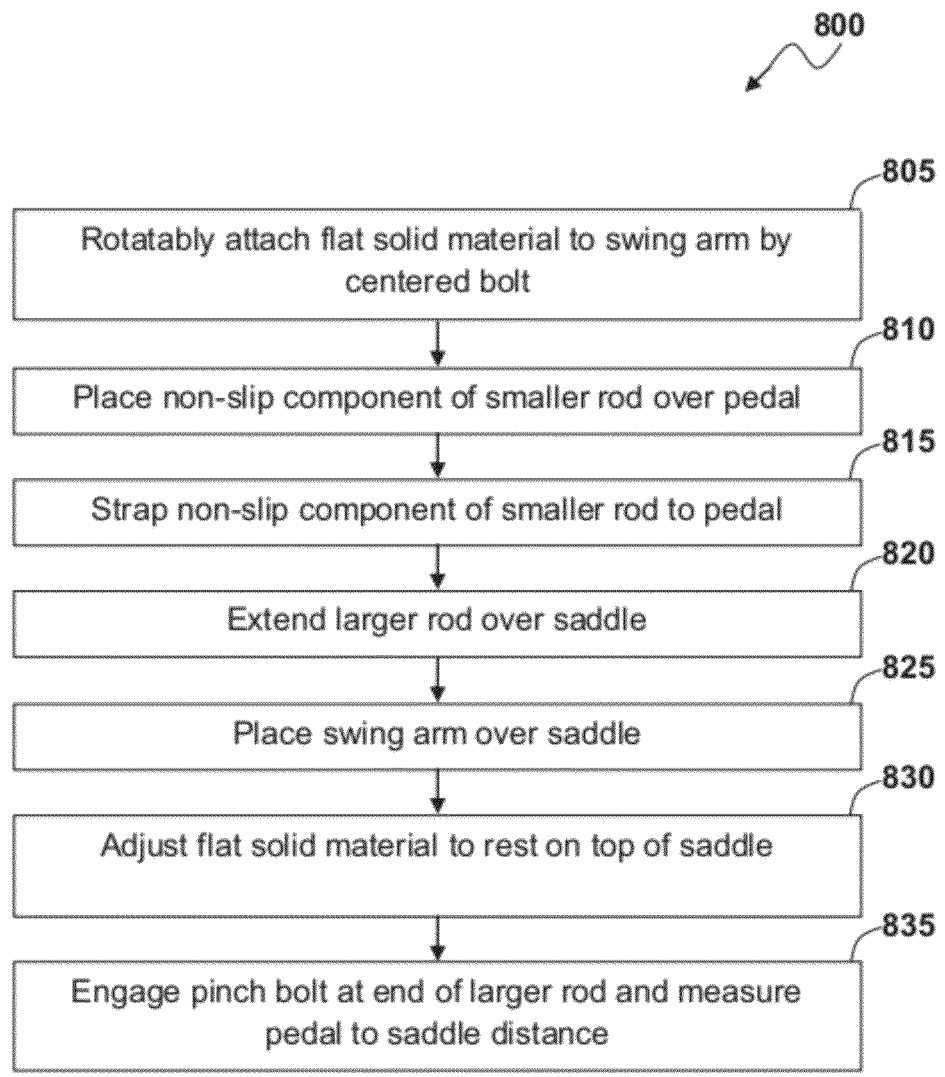
FIG. 7A illustrates a flow chart depicting the process of measuring distance between the pedal and the saddle, in accordance with the disclosed embodiments.

FIG. 7A illustrates a flow chart depicting one example of a method 800 of measuring the distance between the pedal and the saddle of a bicycle by utilizing the bicycle seating position measuring apparatus 100 depicted in FIG. 1A, in accordance with the disclosed embodiments. As illustrated at block 805, the flat solid material can be rotatably attached to the swing arm by a centered bolt. Then, the non-slip component of the smaller diameter rod can be placed over the pedal as depicted at block 810. As illustrated next at block 815, the non-slip component of the smaller rod can be strapped to the bicycle pedal utilizing one or more fastening mechanisms, such as, for example, elastic straps or hook and loop straps. Then, the larger diameter rod can be extended over the bicycle saddle, as illustrated at block 820. As indicated next at block 825, the swing arm can be placed over the bicycle saddle. The flat solid material can be adjusted such that it rests on top of the saddle as described at block 830. Finally, as illustrated at block 835, the pinch bolt at end of larger rod can be engaged and the pedal to saddle distance measured.

Figure 7B:
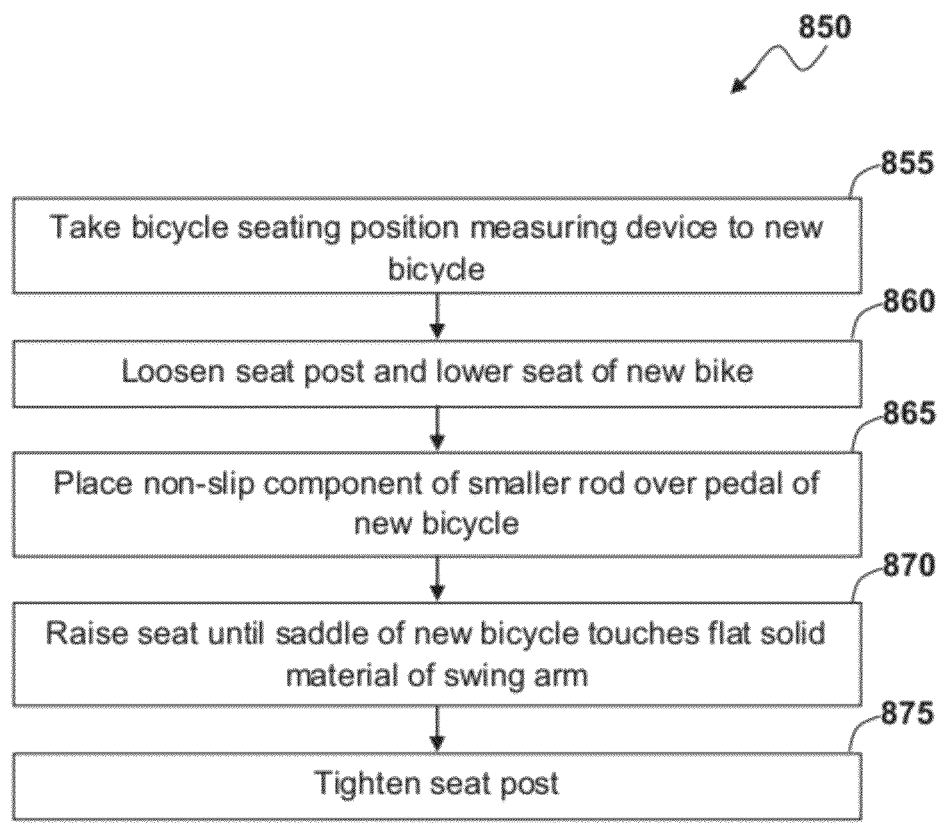
FIG. 7B illustrates a flow chart depicting the process of setting measured distance between the pedal and the saddle of one bicycle in another bicycle, in accordance with the disclosed embodiments.

FIG. 7B illustrates a flow chart depicting a method 850 of setting a measured distance between the pedal and the saddle of one bicycle with respect to another bicycle, in accordance with the disclosed embodiments. As indicated at block 855, the bicycle seating position measuring apparatus can be taken to new bicycle. Then, the seat post of new bicycle can be loosened to lower its seat and the non-slip component of the smaller rod can be placed over the pedal of the new bicycle, as illustrated at 860 and 865. The seat can be raised up until the saddle of the new bicycle touches the flat solid material of the swing arm as depicted at block 870. Finally, as shown at block 875, the seat post can be tightened.

Figure 8:
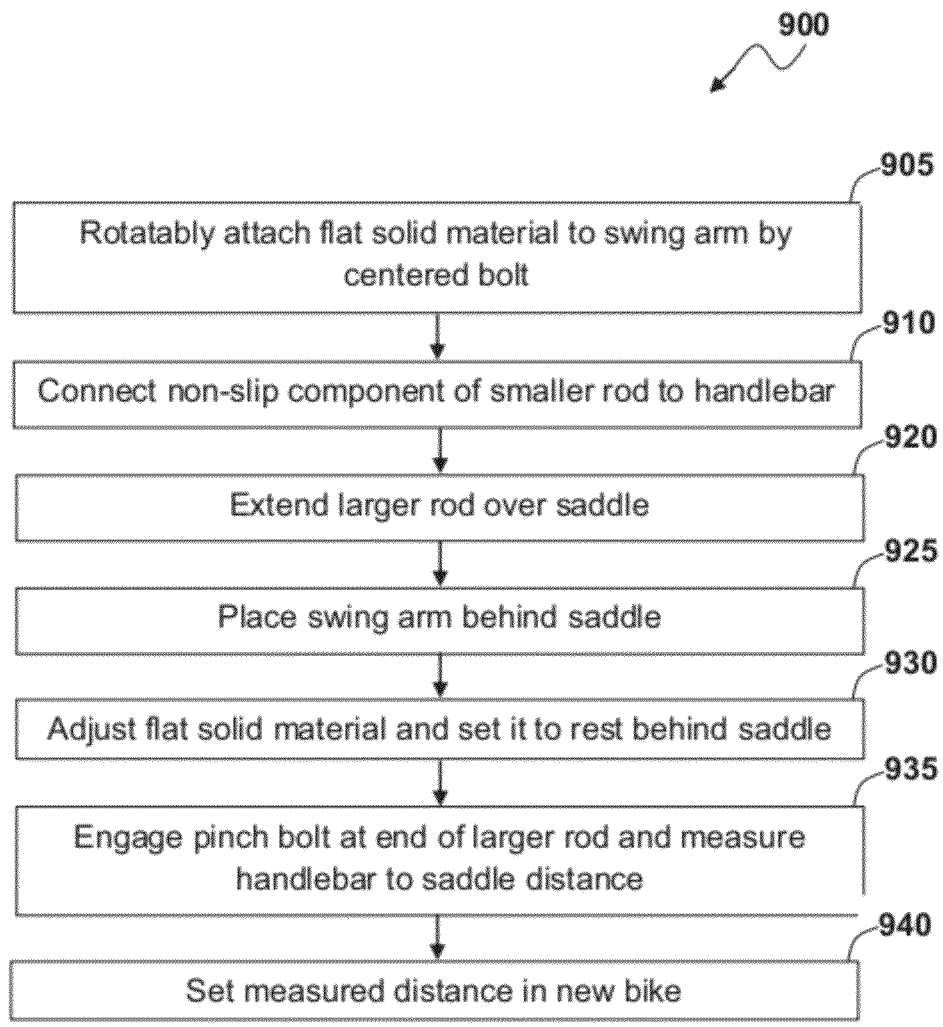
FIG. 8 illustrates a flow chart depicting the process of measuring distance between the handlebars and the saddle, in accordance with the disclosed embodiments.

FIG. 8 illustrates a flow chart depicting a method 900 of measuring distance between handlebar and saddle, in accordance with the disclosed embodiments. The flat solid material can be rotatably attached to the swing arm by a centered bolt, as illustrated at block 905. As indicated next at block 910, the non-slip component of the smaller rod can be connected to the bicycle handlebar. Thereafter, as depicted at blocks 920 and 925, the larger rod can be extended over the saddle and the swing arm placed behind the saddle. Then, as described at block 930, the flat solid material can be adjusted such that it rests behind the bicycle saddle. The pinch bolt at the end of the larger rod can be engaged and the handlebar to saddle distance measured, as illustrated at block 935. Finally, the measured distance can be set with respect to the new bicycle, as depicted at block 940.

Based on the foregoing, it can be appreciated that a number of embodiments, preferred and alternative, are disclosed herein. For example, in one embodiment, an apparatus for measuring a seating position of a bicycle can be implemented. Such an apparatus may include, for example, a telescoping rod comprising a larger diameter rod and a smaller diameter rod, wherein the smaller diameter rod slides into the larger diameter rod to permit an up and down movement of the smaller diameter rod; a pinch closure mechanism for locking a movement of the smaller diameter rod after measuring the seating position of the bicycle; a swing arm attached to the smaller diameter rod; and a flat portion rotatably attached to the swing arm and a non-slip component attached to the larger diameter rod, wherein the telescoping rod together with the pinch closure mechanism, the swing arm, the flat portion and the non-slip component assist in measuring the seating position of the bicycle.

In another embodiment, at least one fastening mechanism can be attached to the non-slip component. In yet another embodiment, the measuring distance between a saddle and a pedal of the bicycle can be determined by fastening the at least one fastening mechanism to the pedal and by resting the flat portion on the saddle. In still another embodiment, the measuring distance between the saddle and a handlebar of the bicycle can be determined by fastening the at least one fastening mechanism to the handlebar and by resting the flat portion behind the saddle. In another embodiment, the seating position of the bicycle can be utilized to set a seating position of another bicycle after measuring the seating position of the bicycle.

In other embodiments, the at least seating position measurement of the bicycle can be utilized to set the seating position of the bicycle when changes are made. In still other embodiments, the at least one fastening mechanism can include, for example, a pair of elastic straps. In other embodiments, the at least one fastening mechanism can include a combination of, for example, hook and loop straps. In still other embodiments, the at least one fastening mechanism can comprise a spring clasp.

In still another embodiment, an apparatus for measuring a seating position of a bicycle, can be implemented, which includes, for example, a telescoping rod comprising a larger diameter rod and a smaller diameter rod, wherein the smaller diameter rod slides into and is received by the larger diameter rod to permit an up and down movement of the smaller diameter rod with the larger diameter rod. Such an embodiment may also include, for example, a pinch closure mechanism for locking a movement of the smaller diameter rod after measuring the seating position of the bicycle; a swing arm attached to the smaller diameter rod; a flat portion rotatably attached to the swing arm; and a non-slip component attached to the larger diameter rod and at least one fastening mechanism, wherein the telescoping rod together with the pinch closure mechanism, the swing arm, the flat portion and the non-slip component assist in measuring the seating position of the bicycle.

In another embodiment, a method for measuring a seating position of a bicycle, can be implemented. Such a method can include, for example, configuring a telescoping rod to include a larger diameter rod and a smaller diameter rod, wherein the smaller diameter rod slides into the larger diameter rod to permit an up and down movement of the smaller diameter rod; providing a pinch closure mechanism for locking a movement of the smaller diameter rod after measuring the seating position of the bicycle; attaching a swing arm to the smaller diameter rod; rotatably attaching a flat portion to the swing arm; and connecting a non-slip component to the larger diameter rod, wherein the telescoping rod together with the pinch closure mechanism, the swing arm, the flat portion and the non-slip component assist in measuring the seating position of the bicycle.

It will be appreciated that variations of the above disclosed apparatus and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An apparatus for measuring a seating position of a bicycle, said apparatus comprising:
   a telescoping rod comprising a larger diameter rod and a smaller diameter rod, wherein the smaller diameter rod slides into said larger diameter rod to permit an up and down movement of said smaller diameter rod;
   a pinch closure mechanism for locking a movement of said smaller diameter rod after measuring said seating position of said bicycle;
   a swing arm attached to said larger diameter rod; and
   a flat portion rotatably attached to said swing arm and a non-slip component attached to said smaller diameter rod, wherein said telescoping rod together with said pinch closure mechanism, said swing arm, said flat portion and said non-slip component assist in measuring said seating position of said bicycle, wherein said at least one fastening mechanism comprises a pair of elastic straps.

2. The apparatus of claim 1 further comprising at least one fastening mechanism attached to said non-slip component.

3. The apparatus of claim 2 wherein said measuring distance between a saddle and a pedal of said bicycle is determined by fastening said at least one fastening mechanism to said pedal and by resting said flat portion on said saddle.

4. The apparatus of claim 2 wherein said measuring distance between said saddle and a handlebar of said bicycle is determined by fastening said at least one fastening mechanism to said handlebar and by resting said flat portion behind said saddle.

5. An apparatus for measuring a seating position of a bicycle, said apparatus comprising:
   a telescoping rod comprising a larger diameter rod and a smaller diameter rod, wherein the smaller diameter rod slides into said larger diameter rod to permit an us and down movement of said smaller diameter rod;
   a pinch closure mechanism for locking a movement of said smaller diameter rod after measuring said seating position of said bicycle;
   a swing arm attached to said larger diameter rod; and
   a flat portion rotatably attached to said swing arm and a non-slip component attached to said smaller diameter rod wherein said telescoping rod together with said pinch closure mechanism, said swing arm, said flat portion and said non-slip component assist in measuring said seating position of said bicycle, wherein said at least one fastening mechanism comprises a combination of hook and loop straps.

6. The apparatus of claim 5 further comprising at least one fastening mechanism attached to said non-slip component.

7. The apparatus of claim 6 wherein said measuring distance between a saddle and a pedal of said bicycle is determined by fastening said at least one fastening mechanism to said pedal and by resting said flat portion on said saddle.

8. The apparatus of claim 6 wherein said measuring distance between said saddle and a handlebar of said bicycle is determined by fastening said at least one fastening mechanism to said handlebar and by resting said flat portion behind said saddle.

9. An apparatus for measuring a seating position of a bicycle, said apparatus comprising:
   a telescoping rod comprising a larger diameter rod and a smaller diameter rod, wherein the smaller diameter rod slides into said larger diameter rod to permit an up and down movement of said smaller diameter rod;
   a pinch closure mechanism for locking a movement of said smaller diameter rod after measuring said seating position of said bicycle;
   a swing arm attached to said larger diameter rod; and
   a flat portion rotatably attached to said swing arm and a non-slip component attached to said smaller diameter rod, wherein said telescoping rod together with said pinch closure mechanism, said swing arm, said flat portion and said non-slip component assist in measuring said seating position of said bicycle, wherein said at least one fastening mechanism comprises a spring clasp.

10. The apparatus of claim 9 further comprising at least one fastening mechanism attached to said non-slip component.

11. The apparatus of claim 10 wherein said measuring distance between a saddle and a pedal of said bicycle is determined by fastening said at least one fastening mechanism to said pedal and by resting said flat portion on said saddle.

12. The apparatus of claim 10 wherein said measuring distance between said saddle and a handlebar of said bicycle is determined by fastening said at least one fastening mechanism to said handlebar and by resting said flat portion behind said saddle.

13. An apparatus for measuring a seating position of a bicycle, said apparatus comprising:
   a telescoping rod comprising a larger diameter rod and a smaller diameter rod, wherein the smaller diameter rod slides into and is received by said larger diameter rod to permit an up and down movement of said smaller diameter rod with said larger diameter rod;
   a pinch closure mechanism for locking a movement of said smaller diameter rod after measuring said seating position of said bicycle;
   a swing arm attached to said larger diameter rod;
   a flat portion rotatably attached to said swing arm; and
   a non-slip component attached to said smaller diameter rod and at least one fastening mechanism, wherein said telescoping rod together with said pinch closure mechanism, said swing arm, said flat portion and said non-slip component assist in measuring said seating position of said bicycle.

14. The apparatus of claim 13 wherein said measuring distance between a saddle and a pedal of said bicycle is determined by fastening said at least one fastening mechanism to said pedal and by resting said flat portion on said saddle.

15. The apparatus of claim 13 wherein said measuring distance between said saddle and a handlebar of said bicycle is determined by fastening said at least one fastening mechanism to said handlebar and by resting said flat portion behind said saddle.

16. The apparatus of claim 13 wherein said seating position of said bicycle is utilized to set a seating position of another bicycle after measuring said seating position of said bicycle.

17. The apparatus of claim 13 wherein at least seating position measurement of said bicycle is utilized to set said seating position of said bicycle when changes are made.

18. The apparatus of claim 13 wherein said at least one fastening mechanism comprises at least one of the following: a pair of elastic straps; a combination of hook and loop straps; and a spring clasp.

* * * * *